UNITED STATES PATENT OFFICE.

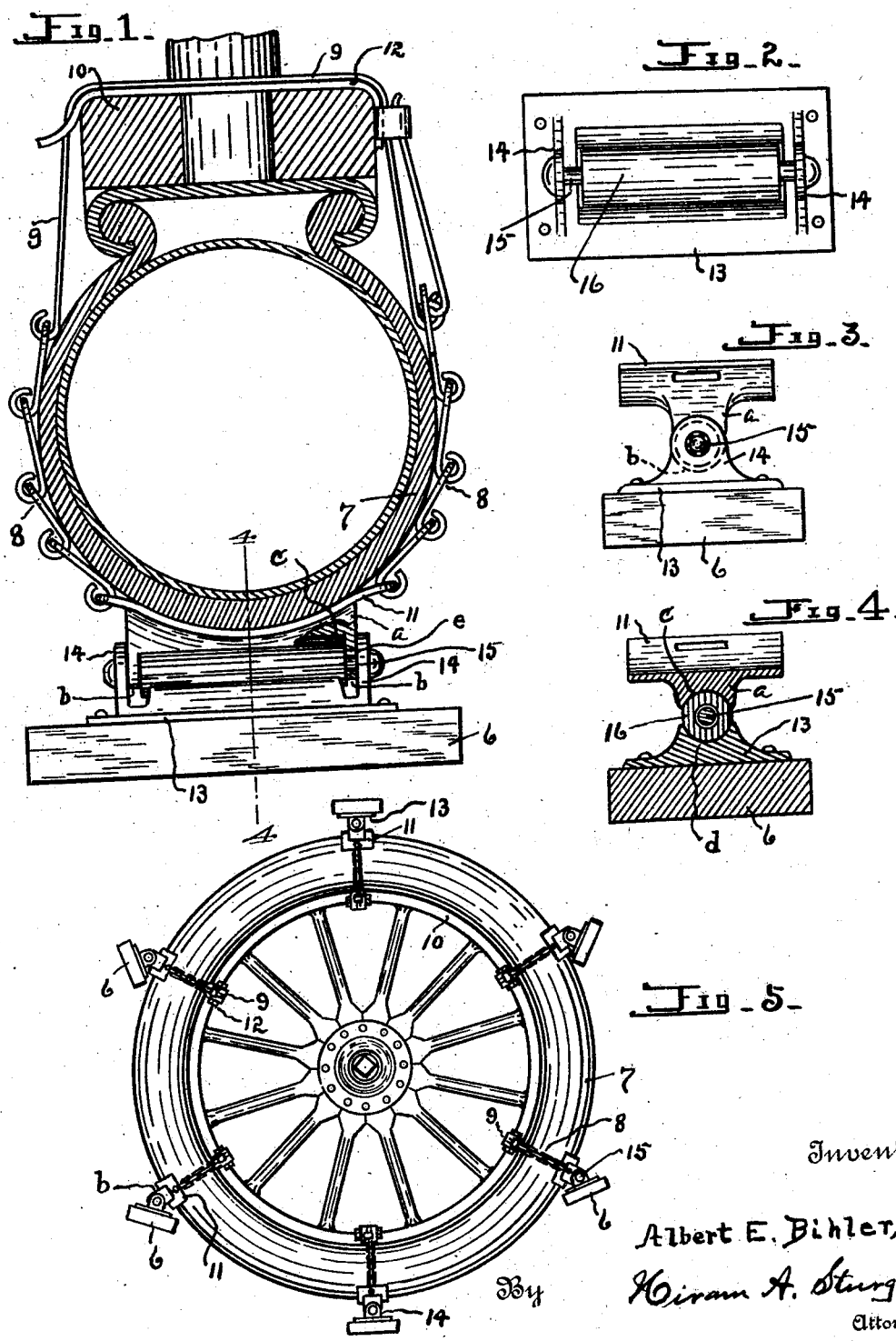

ALBERT E. BIHLER, OF OMAHA, NEBRASKA.

TRACTION APPENDAGE FOR WHEEL TIRES.

1,407,832. Specification of Letters Patent. Patented Feb. 28, 1922.

Application filed August 30, 1919. Serial No. 320,875.

*To all whom it may concern:*

Be it known that I, ALBERT E. BIHLER, a citizen of the United States, residing at Omaha, in the county of Douglas, and State of Nebraska, have invented certain new and useful Improvements in Traction Appendages for Wheel Tires, of which the following is a specification.

This invention relates to traction blocks for vehicle wheels and has for its object to provide blocks which may be readily applied to wheel tires to prevent skidding and particularly for use upon the tires of trucks or heavy vehicles when passing through mud holes or ascending slippery inclines.

The invention consists of the novel construction, combination and arrangement of parts as described herein and claimed, and as illustrated in the accompanying drawing, wherein,—

Fig. 1 is a view in transverse section through a vehicle tire, showing one of the blocks mounted thereon. Fig. 2 is a plan view of a bearing-plate provided with a sleeve and pintle. Fig. 3 is an end view of the traction-block, a bearing-plate and a tread-plate. Fig. 4 is a transverse section through the traction-block, bearing-plate, tread-plate and pintle on line 4—4 of Fig. 1, the tire casing being omitted. Fig. 5 is a side view of a wheel showing the traction-blocks mounted on the tire.

Referring now to the drawing for a more particular description, I provide blocks 6, preferably rectangular in plan, adapted to be removably secured to the tire-casing 7 by any suitable means, the means herein shown consisting of chains 8, together with certain connections, and since the blocks 6 have an adequate area, they will engage the ground to advantage to prevent the tire from slipping or sliding while the wheel is rotating, especially when the ground is wet or soft; and if a sufficient number of blocks are employed it is obvious that transverse movements or skidding of the wheel may be prevented.

The device consists, in part of a U-shaped plate of yoke 9 which is mounted upon the felly 10, the arms of the yoke providing a mounting for the inner ends of the pair of comparatively short chains 8, or equivalent members, a tread-plate 11 being connected with the outer ends of said chains. Numeral 12 indicates a flexible strip or cushion interposed between the yoke and felly to protect the latter from undue wear or injury; and since the yoke is metallic and is of U-shape to suitably engage the sides of the felly, all transverse stresses will be adequately resisted and said plate 11 will be maintained at the medial line of the tire.

The tread-plate has a concaved surface conforming approximately to the transverse curvature of the casing or tire upon which it is adapted to be seated, and it is provided with an outwardly projecting body-portion $a$, and, as best shown in Fig. 1, it is provided with a pair of outwardly projecting arms $b$, and, as best shown in Fig. 4, said body-portion $a$ is provided with a recess having a concaved wall $c$.

Numeral 13 indicates a bearing-plate having a pair of apertured arms 14, said plate being provided with a recess having a concaved wall $d$. Numeral 15 indicates a pintle which is disposed in the apertures of the arms $b$ and 14, and upon the pintle is loosely mounted a sleeve or roller-member 16; and upon the plates 13 are mounted the blocks 6.

As thus described the blocks 6 may have a limited swinging movement on the arms $b$ of the tread-plate, this being a desired feature since they may swing dependably, and when driving upon wet or soft ground, the blocks, while engaging therein, will not resist removal from the mud, sand or soft earth in an appreciable degree. Also, it will be appreciated that the weight of the load or the greater part thereof will be sustained by the sleeves, said sleeves being pressed between the concaved surfaces $c$ and $d$, the pintle 15 not sustaining any appreciable weight since the sleeve is loosely mounted thereon, the arms $b$ having apertures $e$ of greater area than the area of the pintle in cross-section, whereby the function discharged by the pintle is simply to hold the parts to prevent separation. It will be seen that the mounting of the parts as described is an important feature. The device is particularly useful upon the wheel-tires of trucks which may carry heavy loads, and since the pressure or stresses will be directed to the sleeves 16, it is considered that the arms $b$ and 14 and the pintle 15 will not become broken or injured.

I have described construction in detail but I do not wish to be understood as limiting myself in this respect, and changes in form, size, proportion and minor details may be made, as found to be of advantage, said changes to be determined by the scope of the invention as claimed.

What I claim as new and desire to secure by Letters Patent is,—

1. In a traction appendage for wheel tires, a tread plate having a pair of ears, means for securing the tread plate to a tire, a bearing block having a pair of ears adapted to register with the ears of the tread plate, a pintle secured through said ears for hingedly connecting the bearing block and the tread plate, said tread plate and bearing block having complemental recesses therein of substantially semi-cylindrical configuration and the portions of said tread plate and bearing block at the opposite sides of the recesses forming stop shoulders to limit the pivoting of the bearing block on the tread plate without subjecting said ears to an edgewise stress, and a roller loosely mounted on said pintle and seated in said recesses, said roller being adapted to take up and transmit pressure between the bearing block and the tread plate when supporting a wheel, and said roller being adapted to turn in said recesses incident to imposition of axially turning moments imposed on said bearing block while supporting the load.

2. In a traction appendage for wheel tires, a tread plate adapted to be secured to the tread of a tire, a bearing block for contact with the road way, said tread plate and bearing block having pairs of spaced apart ears adapted to register, a pintle secured through said ears for hinging the bearing block to the tread plate, and a roller loosely mounted on the pintle between the tread plate and the bearing block, and between said ears for directly taking up and transmitting stresses between the bearing block and tread plate when the bearing block is supporting the wheel, said roller being adapted to permit of the turning of the bearing block upon the tread plate while supporting the load, and relieving the pintle and ears from stress.

In testimony whereof, I have affixed my signature in presence of two witnesses.

ALBERT E. BIHLER.

Witnesses:
HIRAM A. STURGES,
EDWARD M. IMES.